United States Patent
Bernard et al.

(10) Patent No.: US 9,868,848 B2
(45) Date of Patent: Jan. 16, 2018

(54) ADDITIVES MADE FROM FATTY DIAMIDES FOR NUCLEOPHILE-SENSITIVE CROSS-LINKABLE COMPOSITIONS

(71) Applicant: Arkema France, Colombes (FR)

(72) Inventors: Michael Y. Bernard, Enghien les Bains (FR); Germain Fauquet, Socx (FR); Laurent J. C. Lepinay, Meru (FR); Vincent F. Leroy, Fitz James (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/032,376

(22) PCT Filed: Oct. 21, 2014

(86) PCT No.: PCT/FR2014/052669
§ 371 (c)(1),
(2) Date: Apr. 27, 2016

(87) PCT Pub. No.: WO2015/063389
PCT Pub. Date: May 7, 2015

(65) Prior Publication Data
US 2016/0272783 A1    Sep. 22, 2016

(30) Foreign Application Priority Data
Oct. 31, 2013 (FR) ........................... 13 60675

(51) Int. Cl.
*C08G 18/00* (2006.01)
*C08K 5/20* (2006.01)
*C08G 18/10* (2006.01)
*C08G 18/38* (2006.01)

(52) U.S. Cl.
CPC ............ *C08K 5/20* (2013.01); *C08G 18/10* (2013.01); *C08G 18/3825* (2013.01); *C08G 2190/00* (2013.01)

(58) Field of Classification Search
None
See application file for complete search history.

(56) References Cited

U.S. PATENT DOCUMENTS

| | | | |
|---|---|---|---|
| 6,548,593 | B2 | 4/2003 | Merz et al. |
| 2008/0153924 | A1 | 6/2008 | Caron et al. |
| 2010/0286419 | A1 | 11/2010 | Santhanam et al. |
| 2012/0016065 | A1 | 1/2012 | Sawada et al. |

FOREIGN PATENT DOCUMENTS

JP    63015876    1/1988

*Primary Examiner* — Ana L Woodward
(74) *Attorney, Agent, or Firm* — Lynn B. Morreale

(57) ABSTRACT

The present invention relates to a composition based on fatty acid diamide comprising: a) from 92% to 100% by weight of one or more fatty acid diamides, treated in situ by a neutralizing agent so as to reduce the residual amine content to a residual amine number, expressed in mg KOH/g, which remains less than 0.5, b) optionally, up to 8% by weight of at least one amorphous or semicrystalline oligomer with a Tg of greater than 60° C., with the sum of the % by weight a)+b) being equal to 100% by weight of the said diamide composition and with a) and b) being miscible as a blend.

16 Claims, No Drawings

US 9,868,848 B2

ADDITIVES MADE FROM FATTY DIAMIDES FOR NUCLEOPHILE-SENSITIVE CROSS-LINKABLE COMPOSITIONS

CROSS-REFERENCE TO RELATED APPLICATIONS

This application is a national stage application under 35 U.S.C. §371 of PCT/FR2014/052669, filed Oct. 21, 2014, which claims benefit to FR patent application FR 13.60675, filed Oct. 31, 2013.

The present invention relates to a specific composition based on fatty acid diamide which is suitable as rheology additive in crosslinkable compositions, in particular "one-component" or 1K compositions, more particularly in compositions comprising a component which is sensitive to nucleophiles, such as crosslinkable polyurethane compositions.

BACKGROUND OF THE INVENTION

There already exists rheology additives which are fatty acid diamides, used for mastic and adhesive compositions, in particular diamides based on 12-hydroxystearic acid. These diamides, which are provided in the form of a micronized powder having a mean particle size ranging from 5 to 20 µm, are organogelators, that is to say small organic molecules capable of gelling organic solvents of all types, even at relatively low concentrations by weight. In their medium, they are often arranged in the form of fibres, which explains their organogelating and rheology-modifying effect. The change from the form of a powder to the form of fibres in an organic medium is known as activation. This activation is obtained by high shearing at a temperature suited to the use.

These diamides make it possible to have good performances in mastics of "MS-Polymer®" type, which are hybrid polymers based on alkoxylated silane endings, or polyurethane/silanes technology, with blocked silane endings, but they are poorly suited to the technology of polyurethane compositions, in particular one-component polyurethane compositions, symbolized in abbreviation by "1K-PU", where they may generate problems of stability of these mastics, with premature crosslinking and a limited pot life in use, rendering the composition unusable.

Additives such as treated silicas and polyureas exist as alternative routes.

However, silicas present problems of health and safety during the handling thereof because of the very fine dusts emitted into the atmosphere, the problems of performance, of reproducibility and of sedimentation, in comparison with organic additives, such as amides or polyureas. There exists a known alternative among "organic" additives which are polyureas, often developed to be measured by the formulators of polyurethanes themselves. The polyureas manufactured from isocyanates and amine have, on the other hand, the disadvantage of being difficult to control as additives in terms of structure, of the performances and of reproducibility of the said performances and of manufacture, which reproducibility is related to problems of solubility and of compatibility with the manufacturing or application medium, in view of the very cohesive structure of a urea bond. Such a urea-based rheology additive is described, for example, in U.S. Pat. No. 6,548,593.

The present invention is targeted at an additive "activatable" at low temperature in a formulation which is sensitive to nucleophiles, in particular polyurethane, such as 1K-PU but also 2K-PU, more particularly 1K-PU, which additive offers an effective rheological solution and makes it possible to retain the stability of the formulations which are sensitive to nucleophiles, in particular polyurethanes, more particularly 1K-PU mastics, or other compositions which are sensitive to nucleophiles. The main technical problem to be solved is thus the search for means which make it possible to retain the stability of the said sensitive formulations during storage. Subsequently, as regards the rheological performance related essentially to the activation process, this performance will depend on the choice of the temperature and of the plasticizer used as a function of the final application medium.

The present invention is targeted more specifically at compositions with amide additives which allow them to be used as organogelators and in particular as rheology additives in compositions of formulations which are sensitive to nucleophiles, without the disadvantages mentioned of the state of the art, while preventing the deterioration in the stability of the said compositions or a premature gelling (signifying here irreversible crosslinking).

SUMMARY OF THE INVENTION

The first subject-matter of the invention is a composition based on fatty acid diamide, which composition comprises and in particular consists of:
a) from 92% to 100% by weight of one or more fatty acid diamides, the said diamide(s) being treated in situ by a neutralizing agent, so as to reduce the residual amine content in the said one or more fatty acid diamides to a residual amine number, expressed in mg KOH/g, which remains less than 0.5, preferably less than 0.15, more preferably less than 0.1 and more preferably still less than 0.05,
b) optionally, up to 8%, preferably from 1% to 8%, by weight of at least one amorphous or semicrystalline oligomer with a Tg of greater than 60° C., preferably of greater than 70° C., provided that, if the said oligomer b) is present, the sum of the % by weight a)+b) is equal to 100% by weight of the said diamide-based composition, and that a) and b) are miscible as a blend in particular in the molten state, and that the said oligomer b) is devoid of any nucleophilic group or structure. According to an alternative form, the said composition comprises and in particular consists of:
a) from 92% to 99% by weight of one or more of the said fatty acid diamides,
b) from 1% to 8% by weight of the said oligomer.

DETAILED DESCRIPTION OF THE INVENTION

The amine number as mentioned above is measured by potentiometric titration using, as reagent, 0.1 M HCl in a toluene/n-butanol solvent with a ratio by volume 1/2. The product can be dissolved at 80° C. in the said mixture of solvents.

"Molten state", mentioned above, means, according to the invention, taking place at a temperature where the said diamide is in the molten state, which means that b) has to be molten at this same temperature, if it is present. The term "miscible" means homogenous and transparent in the molten state without phase separation.

The Tg is determined by DSC measurement and corresponds to the temperature of the inflexion point at the 2nd pass, at a heating rate of 10° C./min. More particularly, as regards the said diamide-based composition, the number-average molecular weight Mn of the said oligomer b) is less than 10 000 and preferably less than 5000. The said weight Mn is measured by GPC in THF as equivalents of polystyrene used as standard.

According to a particularly preferred option, the said fatty diamide is the reaction product of a diamine with a hydroxylated fatty monoacid. More particularly, the said hydroxylated fatty acid is chosen from at least one hydroxylated fatty acid of the group: 12-hydroxystearic acid (12-HSA), 9-hydroxystearic acid, 10-hydroxystearic acid and 14-hydroxyeicosanoic acid, and preferably 12-hydroxystearic acid. According to a first alternative form, the said diamide a) is symmetrical and the reaction product of one mole of aliphatic $C_2$ to $C_6$ diamine and of two moles of a hydroxylated fatty monoacid from: 12-hydroxystearic acid (12-HSA), 9- and/or 10-hydroxystearic acid or 14-hydroxyeicosanoic acid, and preferably 12-hydroxystearic acid.

According to a first more particular alternative form, the said diamide a) is symmetrical and corresponds to the reaction product of one mole of linear aliphatic $C_2$ to $C_6$ diamine with two moles of 12-hydroxystearic acid (12-HSA).

Mention may more specifically be made, as suitable $C_2$ to $C_6$ diamines, of the following: ethylenediamine, propylenediamine, butylenediamine, pentanediamine and hexamethylenediamine.

According to another alternative form, the said diamide a) comprises at least one asymmetric diamide, the reaction product of one mole of linear aliphatic $C_2$ to $C_6$ diamine with one mole of $C_5$ to $C_{12}$ monocarboxylic acid and with one mole of a hydroxylated fatty monoacid from: 12-hydroxystearic acid (12-HSA), 9- and/or 10-hydroxystearic acid or 14-hydroxyeicosanoic acid, and preferably 12-hydroxystearic acid.

According to this alternative form, the said diamide a) more particularly comprises at least one asymmetric diamide which corresponds to the reaction product of one mole of linear aliphatic $C_2$ to $C_6$ diamine with one mole of 12-hydroxystearic acid (12-HSA) and one mole of $C_5$ to $C_{12}$ monocarboxylic acid.

Mention may more specifically be made, as suitable $C_5$ to $C_{12}$ monocarboxylic acids, of the following: pentanoic acid, hexanoicacid, heptanoic acid, octanoic acid, nonanoic acid, decanoic acid, undecanoic acid or dodecanoic (or lauric) acid.

More particularly, according to the invention, the said neutralizing agent comprises at least one functional group which reacts with the said residual (or free) amine so that the neutralized diamide(s) has or have at the end an amine number as defined above. Preferably, the said neutralizing agent has a boiling point of at least 130° C. and more preferably at least 150° C., this being for reasons of ease of addition and of effectiveness of the neutralization of the residual amine in the diamide, in particular in the molten state. More particularly, the said neutralizing agent can be selected from:
  strong inorganic or organic acids, in particular acids having a pKa (Ka being the acidity constant) of less than 2 (<2) and preferably of less than 1 (<1), and/or
  monocarboxylic acid halides, in particular monocarboxylic acid chlorides,
  polycarboxylic acid halides with carbon chains having a number of carbon atoms of less than 10.

The said strong inorganic or organic acids can be Brönsted or Lewis acids. The strong inorganic acids can in particular be sulphonyl halides, in particular sulphonyl chlorides, such as tosyl chloride (4-toluenesulphonyl chloride).

The strong organic acids can be organic acids or organic anhydrides halogenated in the chain carrying the acid group, which can, for example, be carboxyl or sulphonyl. In this case, the said halogen can be chosen from Cl or F. Mention may be made, as examples of suitable strong organic acids, of trichloroacetic acid or trifluoroacetic acid or trifluoromethanesulphonic acid (also known as triflic acid).

Mention may be made, as suitable examples of strong inorganic acids, without limitation, of sulphuric acid or tosyl chloride.

Mention may be made, as examples of monocarboxylic acid halides (acyl halide), of benzoyl chloride or of hexanoyl chloride.

Mention may be made, as examples of polycarboxylic acid halides, of glutaroyl chloride, adipoyl chloride, pimeloyl chloride, suberoyl chloride, sebacoyl chloride or o-phthaloyl chloride.

According to a specific preference, the said neutralizing agent is present in an at least stoichiometric amount with respect to the residual amine number, that is to say the amine number of the said diamide(s) a) before neutralization, with the neutralization product remaining in situ in the said diamide(s) thus treated.

The said oligomer b), if present, can in particular be functionalized, preferably with a carboxylic acid functional group, or it can be nonfunctionalized. The said oligomer b) can be selected from: polyamide, polyester, at least one copolymer of maleic anhydride or of acrylic acid or of methacrylic acid with at least one other comonomer, in particular copolymer from maleinized oligoethylene, maleinized resin of vinylaromatic monomers or copolymer of maleic anhydride or of acrylic acid or of methacrylic acid with at least one vinylaromatic monomer, preferably styrene/maleic anhydride copolymer, styrene/(meth)acrylic acid copolymer, maleinized resin based on cycloaliphatic monomers, maleinized semicrystalline waxes, maleinized resin of (petroleum) hydrocarbons, maleinized resin of rosin, including maleinized esters of rosin. Mention may be made, among the preferred oligomers, of polyamides and copolymers of maleic anhydride or of acrylic acid or of methacrylic acid with at least one other comonomer, such as styrene, or maleinized resins as mentioned above.

The said oligomer b), if present, is devoid of any nucleophilic group or structure, in view of the technical problem to be solved defined above. Mention may be made, as example of groups excluded from the structure of the said oligomer, for example, of amine or hydroxyl. In fact, the said oligomer b) must not be able to react with a component in the final applicational crosslinkable composition.

More particularly, the said oligomer b), if present, is a polyamide which can be present as a blend with the said diamide a) in that it has been prepared in situ in the molten state, after the preparation of the said diamide a) or before the preparation of the said diamide a), in the same reactor with the said treatment by a neutralizing agent applied to the said blend [a)+b)] in the molten state.

According to a specific alternative form, the presence of the said oligomer b) is not essential in the said fatty diamide composition.

The two additive options, with presence or absence of the said oligomer b), exhibit excellent stability performances in the said formulations which are sensitive to nucleophiles, while conferring, on the said formulations, satisfactory rheological performances by an activation appropriate to the formulation. This is because the said activation can depend on the composition of the formulation used, in particular on the nature of the plasticizer and on the activation temperature, which can be adjusted to the said formulation.

According to another alternative form, the said oligomer b) is present in the said fatty diamide composition.

The second subject-matter of the invention is a process for the preparation of a diamide-based composition as defined according to the invention, which process comprises at least the following stages according to the following two options A) or B):

Process according to option A:

i) treatment for the neutralization in the molten state of the said diamide a) by the said neutralizing agent, so that the amine number, expressed in mg KOH/g, is less than 0.5, preferably less than 0.15, more preferably less than 0.1 and more preferably still less than 0.05, and ii) optionally, if the said oligomer b) is present, homogenous blending in the molten state of the said diamide a), thus treated (neutralized), of stage i) with the said oligomer b) in the molten state, iii) cooling the blend of stage i) or the blend of stage ii), if b) is present, and micronizing by mechanical grinding or by an air jet, preferably in order to obtain a volume-average size of less than 15 μm, more preferably of less than 10 μm.

The said size can be determined by laser diffraction.

Process according to option B, only if b) is present:

i) homogenous blending in the molten state of the said diamide a) with the said oligomer b) in the molten state, ii) treatment for the neutralization in the molten state of the said blend of stage i) by the said neutralizing agent, so that the amine number, expressed in mg KOH/g of diamide a), is less than 0.5, preferably less than 0.15, more preferably less than 0.1 and more preferably still less than 0.05, iii) cooling the blend thus treated of stage ii) and micronizing by mechanical grinding or by an air jet, preferably in order to obtain a volume-average size of less than 15 μm, more preferably of less than 10 μm.

According to an alternative form of this process according to option B, the said oligomer b) is a polyamide and the said process comprises a stage of preparation of the said polyamide b) in the molten state, before or after the preparation of the said diamide a) in situ in the same reactor and resulting in the homogenous blend of a) and of b) according to the said stage i), before the said neutralization treatment in the molten state according to stage ii).

A third subject-matter of the invention is a crosslinkable composition which comprises at least one diamide-based composition as defined above according to the invention or obtained by a process as defined above according to the invention, and at least one of the reactive components of which (crosslinkable composition) is sensitive to the presence of a nucleophilic functionality, such as an amine.

According to a first possibility, the said composition relates to a two-component or one-component composition, which comprises at least one component from: polyisocyanate, silane-modified oligomer or polymer (carrying blocked silane endings), in particular silane-modified polyether or silane-modified polyurethane, polyepoxide, silicone, polysulphide, polyanhydride or multifunctional acrylate having a mean functionality of greater than 2, preferably polyisocyanate, polyepoxide, polyanhydride, polysulphide or multifunctional acrylate, more preferably polyisocyanate. Silane-modified oligomers or polymers are, for example, described in "Formulating Adhesives & Sealants" by Bodo Müller and Walter Rath in European Coatings Tech Files of 2010.

In the case of the multifunctional acrylate (MFA), the sensitivity is related to the fact that the residual amine can react by a Michael addition to the said acrylate functional groups with the formation of aminoacrylate bonds by addition of the amine to the acrylate unsaturation, thus prematurely crosslinking the composition to be used.

In other cases, the said amine can react with the main binder, for example polyisocyanate, polyepoxide or polyanhydride, or can catalyse the crosslinking reaction and thus prematurely accelerate the said crosslinking, with, as example of catalysis, the case of polysulphides. Thus, the said sensitivity of the said component can be displayed either by a reactivity effect or by a catalysis effect of the said nucleophilic functional group, such as an amine.

According to one possibility, the said composition as described above relates to a composition for coatings or a composition of coatings, in particular for or of paints, inks or adhesives, or a composition of leaktightness agents, of mastics or of adhesives, or a moulding composition, in particular a composition for composites.

Another subject-matter of the invention is the use of a diamide-based composition as defined according to the invention or obtained by a process of the invention as described above as rheology additive in crosslinkable compositions comprising at least one reactive component which is sensitive to a nucleophilic functional group, in particular in crosslinkable compositions, at least one of the reactive components of which is sensitive (that is to say, reactive or sensitive by catalysis) to the presence of a nucleophilic functionality, such as an amine, compositions such as described above.

Finally, the invention covers a crosslinked finished product which results from the use as defined above. More particularly, the said product is a coating film, in particular a paint, ink or adhesive film. According to another possibility, the said product can be a leaktightness agent, mastic or adhesive seal. Finally, according to another option, the said product can relate to (or be) moulded parts, in particular composite (moulded parts).

The examples which follow are given by way of illustration of the invention and of its performance and do not in any way limit the scope of the invention.

Experimental Part

I—Starting Material Used

TABLE 1

Starting materials used

| Product | Function | Commercial reference | Supplier |
|---|---|---|---|
| 12-Hydroxystearic acid | Reactant | 12-HSA | Jayant Agro |
| Hexanoic acid | Reactant | Hexanoic acid 99% | Aldrich |
| Ethylenediamine | Reactant | Ethylenediamine ≥99.5% (GC) | Aldrich |

TABLE 1-continued

Starting materials used

| Product | Function | Commercial reference | Supplier |
|---|---|---|---|
| Styrene/maleic anhydride copolymer | Reactant | SMA-1000 ® | Cray Valley HSC |
| Sulphuric acid | Reactant | Sulphuric acid ACS reagent, 95.0%-98.0% | Aldrich |
| Diphenylmethane diisocyanate and 4,4'-diphenylmethane diisocyanate in Mesamoll ® | Prepolymer | Desmoseal ® M280 | Bayer |
| Alkylsulphonic phenyl ester | Plasticizer | Mesamoll ® | Lanxess |
| Polyvinyl chloride homopolymer resin | Filler | Solvin ® 373 MC | Solvay |
| Titanium dioxide | Pigment | Ti-pure ® | Dupont |
| $CaCO_3$ | Fillers | Omya ® BLH | Omya |
| $MgCO_3$ | | | |
| Xylene | Solvent | Xylene | Brabant |
| Diphenylmethane diisocyanate and 4,4'-diphenylmethane diisocyanate in Mesamoll ® | Water-capturing agent | Desmodur ® VH20 | Bayer |
| Dibutyltin diacetate (DBTA) | Catalyst | TIB KAT ® 233 | TIB |
| Tosyl isocyanate (monoisocyanate) tosyl chloride | Water-capturing agent | Ti Additive ® | Bayer |
| γ-Glycidoxypropyltrimethoxysilane | Adhesion promoter | Silquest ® A-187 | Momentive |

II—Methods and Tests Used
Extrudability Test

The mastics packaged in cartridges are extruded using an air gun (3M® Air-Operated Flexible Package Applicator type) connected to an air compressor provided with a pressure gauge which makes it possible to control the compressed air flow rate ranging from 250±10 kPa (i.e., 2.5 bar±0.1 bar) during the extrusion. Use is made of an extrusion nozzle with an orifice having a diameter of 5±0.3 mm.

The weight of sample extruded over a given time interval is measured, which makes it possible to find the extrudability of this sample, expressed in g/min.

Evaluation of the Viscosity

A viscometer of Brookfield® DV II+Pro type is fitted to a Helipath® drive motor and a T-bar needle (Spindle: Helipath® spindle set No. 595) is attached to the viscometer using a connection provided for this purpose. The pilot motor ascends and descends slowly, the viscometer thus allowing the T-bar needle to travel a helical course of 30 seconds through the sample, thus avoiding the formation of a channel. The viscosity of systems which do not flow or which have a gel structure, such as mastics, can thus be measured. The viscosity is expressed in mPa·s and is measured every 30 seconds (at mid-journey of the Helipath® ) for 1 minute 45 and for three spindle speeds: 1, 5 and 10 rpm.

Stability Test

The extrudability and viscosity measurements are carried out at the start and after storing at 23° C. for one month. The stability of the rheology of the mastic is established as a function of these two measurements.

Test of Resistance to the Premature Crosslinking in the Cartridge

The cartridges are monitored at the start, after storage for 3 days and after one month. The test consists in opening the cartridge and in observing whether the product present inside can be extruded. The product is not longer extrudable if it is not fluid after the said storage.

III—Comparative Examples and Examples According to the Invention

EXAMPLE 1

Comparative 25.8 grams of ethylenediamine (i.e., 0.43 mol, 0.86 amine equivalent), 135.52 grams of 12-hydroxystearic acid (i.e., 0.43 mol, 0.43 acid equivalent) and 49.94 grams of hexanoic acid (i.e., 0.43 mol, 0.43 acid equivalent) are introduced, under a stream of nitrogen, into a 1 litre round-bottomed flask equipped with a thermometer, a Dean and Stark apparatus, a condenser and a stirrer. The mixture is heated to 200° C., still under a stream of nitrogen. The water eliminated accumulates in the Dean and Stark apparatus from 150° C. The reaction is controlled by the acid number and the amine number. When the acid and amine values are respectively 5 and 3.5 mg KOH/g, the reaction mixture is cooled to 150° C. and then discharged into a silicone mould. Once cooled to ambient temperature, the product is micronized mechanically by grinding in an air jet mill and sieving in order to obtain a fine and controlled particle size with a mean size obtained of 7 μm.

EXAMPLE 2

According to the Invention without Oligomer b)

25.8 grams of ethylenediamine (i.e., 0.43 mol, 0.86 amine equivalent), 135.52 grams of 12-hydroxystearic acid (i.e., 0.43 mol, 0.43 acid equivalent) and 49.94 grams of hexanoic acid (i.e., 0.43 mol, 0.43 acid equivalent) are introduced, under a stream of nitrogen, into a 1 litre round-bottomed flask equipped with a thermometer, a Dean and Stark apparatus, a condenser and a stirrer. The mixture is heated to 200° C., still under a stream of nitrogen. The water eliminated accumulates in the Dean and Stark apparatus from 150° C.

The reaction is controlled by the acid number and the amine number. When the acid and amine values are respectively 5 and 3.5 mg KOH/g, the reaction mixture is cooled to 150° C. and 0.65 g of sulphuric acid is added. The amine number, monitored 30 minutes later, is less than 0.01 mg KOH/g. The reaction mixture is then discharged into a silicone mould. Once cooled to ambient temperature, the product is micronized in an air jet mill as in Example 1 with the same mean size.

EXAMPLE 3

According to the Invention with Oligomer b)

25.8 grams of ethylenediamine (i.e., 0.43 mol, 0.86 amine equivalent), 135.52 grams of 12-hydroxystearic acid (i.e., 0.43 mol, 0.43 acid equivalent) and 49.94 grams of hexanoic acid (i.e., 0.43 mol, 0.43 acid equivalent) are introduced, under a stream of nitrogen, into a 1 litre round-bottomed flask equipped with a thermometer, a Dean and Stark apparatus, a condenser and a stirrer. The mixture is heated to 200° C., still under a stream of nitrogen. The water eliminated accumulates in the Dean and Stark apparatus from 150° C. The reaction is controlled by the acid number and the amine number. When the acid and amine values are respectively 5 and 3.5 mg KOH/g, the reaction mixture is cooled to 150° C. and 0.65 g of sulphuric acid is added. The amine number, monitored 30 minutes later, is less than 0.01 mg KOH/g. The reaction mixture is then cooled to 150° C. and 16 grams of SMA® 1000 are added, having a Tg (DSC, 2nd pass at 10° C./min) of 155° C. 30 minutes later, the blend of the diamide and of the SMA® oligomer is discharged into a silicone mould. Once cooled to ambient temperature, the product is micronized as in Example 1 with the same mean size (7 μm).

IV—Evaluation of Rheological Performance in a "1K-PU" Mastic Formulation

1—Preparation of the 1 K-PU mastic formulations

The formulations are prepared using a laboratory "planetary" mixer (Molteni® EMD 1 type) equipped with a dispersing disc and a scraper which makes it possible to blend products of very high viscosities but also to disperse powders in nonfluid systems. It is equipped with a vacuum pump which makes it possible to prevent the entry of moisture during the dispersing. The temperature within the Molteni® EMD 1 is recorded by a probe attached to the scraper and can be regulated by virtue of a bath.

This mixer makes it possible to prepare batches of 2 kg. Once the process is complete, the mastic is put into cartridges.

TABLE 2

"1K-PU" mastic formulations

| Component | Function | % by weight | | | |
| --- | --- | --- | --- | --- | --- |
| | | F1 | F2 | F3 | F4 |
| Desmoseal ® M 280 | Prepolymer | 31.93 | 31.93 | 31.93 | 31.93 |
| Mesamoll ® | Plasticizer | 19.51 | 19.51 | 19.51 | 19.51 |
| Solvin ® 373 MC | Filler | 19.51 | 19.51 | 19.51 | 19.51 |
| Example 1 | Rheology additive | 2.60 | 0 | 0 | 0 |
| Example 2 | Rheology additive | 0 | 2.60 | 0 | 2.60 |
| Example 3 | Rheology additive | 0 | 0 | 2.60 | 0 |
| Omya ® BLP | Filler | 14.91 | 14.91 | 14.91 | 14.91 |
| $TiO_2$ | Pigment | 3.9 | 3.9 | 3.9 | 3.9 |
| Desmodur ® VH 20 | Water-capturing agent | 0.5 | 0.5 | 0.5 | 0.5 |
| Xylene (A) | Solvent | 3.9 | 3.9 | 3.9 | 3.9 |
| Silquest ® A 187 | Adhesion promoter | 0.5792 | 0.5792 | 0.5792 | 0.5792 |
| TI additive | Water-capturing agent | 0.3968 | 0.3968 | 0.3968 | 0.3968 |
| Xylene (B) | Solvent | 2.224 | 2.224 | 2.224 | 2.224 |
| TIB KAT ® 233 | Catalyst | 0.04 | 0.04 | 0.04 | 0.04 |
| TOTAL | | 100 | 100 | 100 | 100 |

To illustrate the invention and its performances, 4 formulations: F1, F2, F3 and F4 were prepared (see compositions of these formulations in Table 2). In a first stage and in the proportions indicated, the prepolymer and the plasticizer are added and homogenized. The fillers, the pigment and the micronized additive products to be compared (according to Example 1, Example 2 or Example 3) are weighed and added in a second stage. The combined blend is kept under vacuum during the blending phases. In order to activate the additives compared, the temperature of the medium is brought to:

about 50° C. (that is to say, 50±2° C.) for approximately 30 minutes for F1, F2;

about 65° C. (that is to say, 65±2° C.) for approximately 30 minutes for F3, F4.

When this is complete, the adhesion promoter, the xylene (A) and the water-capturing agents are added and homogenized for 5 min. Finally, the catalyst and the xylene (B) are added at a temperature of approximately 45° C. before discharging the mastic and placing it in cartridges.

2—Results of the evaluation of the stability, rheology and other applicative properties of the formulations (Tables 3, 4 and 5):

TABLE 3

Extrudability and viscosity results at 1 day

| Formulation | at 1 day Extrudability (g/min) | Helipath ® Brookfield viscosity (mPa · s at 23° C.) | | |
| --- | --- | --- | --- | --- |
| | | 1 RPM | 5 RPM | 10 RPM |
| F1 | 900 | 45 000 | 40 000 | 44 000 |
| F2 | 850 | 40 000 | 56 000 | 44 000 |
| F3 | 55 | 2.00E+06 | 9.70E+05 | 6.50E+05 |
| F4 | 80 | 2.50E+06 | 1.30E+06 | 9.5E+05 |

TABLE 4

Results of resistance to premature crosslinking in storage

| | Resistance to crosslinking in a cartridge | |
|---|---|---|
| Formulation | Stability at 3 days | Stability at 1 month |
| F1 | crosslinked | crosslinked |
| F2 | Fluid-extrudable | Fluid-extrudable |
| F3 | Fluid-extrudable | Fluid-extrudable |
| F4 | Fluid-extrudable | Fluid-extrudable |

TABLE 5

Extrudability and viscosity results at 1 month

| | at 1 month Extrudability | Helipath ® Brookfield viscosity (mPa · s) at 23° C. | | |
|---|---|---|---|---|
| Formulation | (g/min) | 1 RPM | 5 RPM | 10 RPM |
| F1 | nonextrudable (crosslinked) | (crosslinked) | (crosslinked) | (crosslinked) |
| F2 | 800 | 40 000 | 46 000 | 42 000 |
| F3 | 25 | 2.56E+06 | 1.50E+06 | 9.96E+05 |
| F4 | 40 | 3.00E+06 | 1.50E+06 | 1.00E+06 |

From these comparative results, it can be observed that the formulation F1 based on the additive product according to Example 1 (comparative) is unstable after storing for 3 days and results in a product which is irreversibly crosslinked and which is unusable.

The formulation F2 based on the product according to Example 2 (invention without the oligomer b)) exhibits a very good stability after storing for one month with activation at low temperature (50° C. in the formulation F2) which is reflected by a viscosity of 40 Pa·s at low gradient (1 rpm) after storing for one month. On the other hand, carrying out the activation at a higher temperature with the formulation F4 (65° C. in the formulation F4) makes possible much more effective activation in the same medium (composition) than F2, this performance being reflected by a viscosity approximately 75 times greater and at 3 E+06 mPa·s (3000 Pa·s).

The formulation F3 based on the additive product according to Example 3 (according to the invention with oligomer b)) also makes possible stability without any problem after storing for 1 month. Its viscosity at low gradient (1 rpm) after storing for 1 month is fairly high and of 2500 Pa·s, which is higher than that of the formulation F2 and almost as good as F4.

These results clearly demonstrate that the formulations comprising additives according to the invention exhibit excellent stability on storage after storing for 1 month, while exhibiting very satisfactory rheological performances conferred by the said additive after suitable activation.

The invention claimed is:

1. A rheology additive composition based on fatty acid diamide, comprising:
    a) from 92% to 100% by weight of one or more fatty acid diamides, said diamide(s) being treated in situ after preparation of the diamide by a neutralizing agent selected from the group consisting of inorganic or organic acids with a pKa less than 2 to reduce residual amine content in said treated one or more fatty acid diamides to a residual amine number, expressed in mg KOH/g, less than 0.05,
    b) optionally, from 1% to 8% by weight of at least one amorphous or semicrystalline oligomer with a Tg of greater than 60° C.,
    provided that, if said oligomer b) is present, the sum of the % by weight a) +b) is equal to 100% by weight of said diamide-based composition, and that a) and b) are miscible as a blend in the molten state, and that the said oligomer b) is devoid of any nucleophilic group or structure and wherein said diamide comprises an asymmetric diamide which corresponds to the reaction product of one mole of linear aliphatic $C_2$ to $C_6$ diamine with one mole of 12 hydroxy-stearic acid and one mole of $C_5$ to $C_{12}$ monocarboxylic acid.

2. The rheology additive composition according to claim 1 comprising:
    a) from 92% to 99% by weight of one or more of the said fatty acid diamides,
    b) from 1% to 8% by weight of the said oligomer.

3. The rheology additive composition according to claim 1 wherein the number-average weight Mn of said oligomer b) is less than 10,000.

4. The rheology additive composition according to claim 1 wherein said neutralizing agent comprises at least one functional group which reacts with said residual amine so that the neutralized diamide(s) has in the end an amine number according to claim 1 and a boiling point of at least 130° C.

5. The rheology additive composition according to claim 1 wherein said neutralizing agent is present in an at least stoichiometric amount with respect to the residual amine number, such that said treated diamide has neutralized amino groups remaining in situ.

6. The rheology additive composition according to claim 1 wherein said oligomer b) is functionalized with a carboxylic acid functional group, or is nonfunctionalized.

7. The rheology additive composition according to claim 1 wherein if present, said oligomer b) is selected from the group consisting of: polyamide, polyester, at least one copolymer of maleic anhydride, acrylic, or methacrylic acid with at least one other comonomer, maleinized resin of vinylaromatic monomers, maleinized resin based on cycloaliphatic monomers, maleinized semicrystalline waxes, maleinized resin of petroleum hydrocarbons, and maleinized resin of rosin.

8. The rheology additive composition according to claim 1 wherein if present, said oligomer b) is a polyamide present as a blend with said diamide a) in that it has been prepared in situ in the molten state, after the preparation of the diamide a) or before the preparation of the said diamide a), in the same reactor with the said treatment by a neutralizing agent applied to the said blend [a)+b)] in the molten state.

9. A process for the preparation of the rheology additive composition of claim 1 comprising at least the following stages and according to option A:
    i) neutralizing in the molten state of said diamide a) by said neutralizing agent, so that the amine number, expressed in mg KOH/g, is less than 0.05, and
    ii) optionally, if b) is present, blending homogeneously in the molten state of said diamide a), thus treated (neutralized), of stage i) with said oligomer b) in the molten state,
    iii) cooling the blend of stage i) or the blend of stage ii), if b) is present, and micronizing by mechanical grinding or air jet, to obtain a volume-average size of less than 15 μm.

10. A process for the preparation of the rheology additive composition of claim 1 comprising at least the following stages according to option B, only if the said oligomer b) is present:
  i) blending homogeneously in the molten state of said diamide with said oligomer b) in the molten state,
  ii) neutralizing in the molten state said blend of stage i) by said neutralizing agent, so that the amine number, expressed in mg KOH/g of diamide a), is less than 0.05
  iii) cooling the blend of stage ii) and micronizing by mechanical grinding or air jet, to obtain a volume-average size of less than 15 μm.

11. The process according to claim 10 wherein said oligomer b) is a polyamide and comprising a stage of preparation of said polyamide b) in the molten state, before or after the preparation of said diamide a) in situ in a same reactor and resulting in a homogenous blend of a) and of b) according to said stage i), before said neutralization treatment in the molten state according to stage ii).

12. A crosslinkable composition comprising at least one diamide-based rheology additive composition according to claim 1.

13. A composition according to claim 12 which is a two-component or one-component composition, comprising at least one component from the group consisting of: polyisocyanate, silane-modified oligomer or polymer, polyepoxide, silicone, polysulphide, polyanhydride, and multifunctional acrylate having a mean functionality of greater than 2.

14. The crosslinkable composition according to claim 13, wherein said at least one component is selected from the group consisting of polyisocyanate, polyepoxide, polyanhydride, polysulphide and multifunctional acrylate.

15. the crosslinkable composition according to claim 13, wherein said at least one component is polyisocyanate.

16. A composition according to claim 12 that is a coating, paints, ink, adhesive, or a moulding composition.

* * * * *